United States Patent [19]

Horikawa

[11] Patent Number: 4,754,291

[45] Date of Patent: Jun. 28, 1988

[54] LIGHT BEAM SCANNING RECORDING APPARATUS WIDTH MODULATION OF BOTH TOTAL PULSE DURATION AND INTENSITY

[75] Inventor: Kazuo Horikawa, Kanagawa, Japan

[73] Assignee: Fuji Photo Film Co., Ltd., Kanagawa, Japan

[21] Appl. No.: 17,945

[22] Filed: Feb. 24, 1987

[30] Foreign Application Priority Data

Feb. 24, 1986 [JP] Japan .................................. 61-38606

[51] Int. Cl.$^4$ ...................... G01D 9/42; G01D 15/14; H04H 1/21
[52] U.S. Cl. .................................. 346/108; 346/160; 358/296
[58] Field of Search ................. 346/108, 107 R, 76 L, 346/160; 358/296, 300, 298, 302

[56] References Cited

U.S. PATENT DOCUMENTS

| | | | |
|---|---|---|---|
| 3,708,797 | 1/1973 | Solomon | 346/108 |
| 4,370,667 | 1/1983 | Ohara | 346/108 |
| 4,404,570 | 9/1983 | Ohnishi | 346/108 |
| 4,679,057 | 7/1987 | Hamada | 346/108 |

Primary Examiner—E. A. Goldberg
Assistant Examiner—Mark Reinhart
Attorney, Agent, or Firm—Sughrue, Mion, Zinn, Macpeak & Seas

[57] ABSTRACT

A light beam scanning recording apparatus for recording information on a recording material by modulating a laser beam emitted by a semiconductor laser and scanning the recording material with the modulated laser beam is constituted to modulate the laser beam by combining pulse number modulation or pulse width modulation with intensity modulation. Intensity modulation of the laser beam is conducted by controlling the drive current of the semiconductor laser. A plurality of semiconductor lasers may be provided for scanning with a coalesced laser beam obtained by coalescing laser beams emitted by the semiconductor lasers, and intensity modulation may be conducted by changing the number of the laser beams which are coalesced.

4 Claims, 2 Drawing Sheets

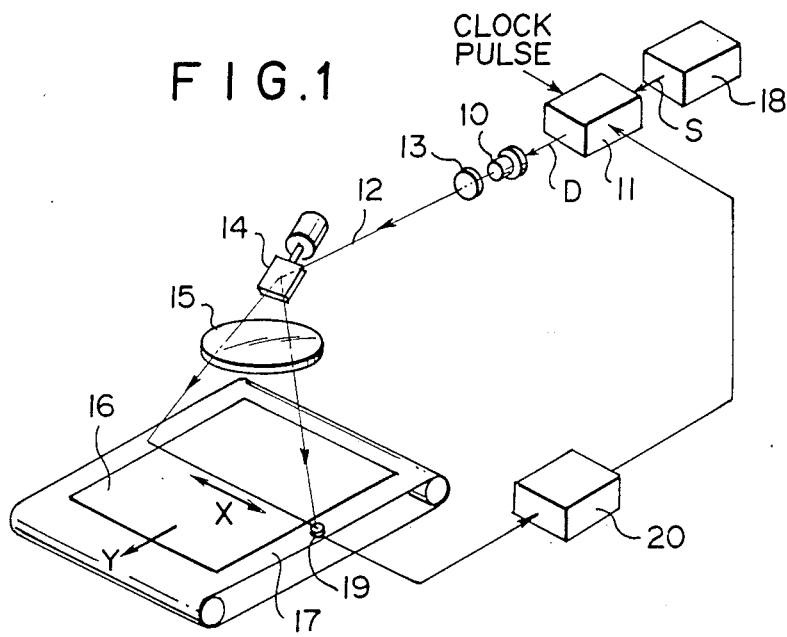
FIG.1
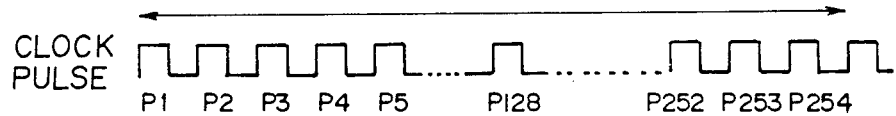
FIG.2A  ONE PICTURE ELEMENT
FIG.2B  PULSE OF INTENSITY $I_2$
FIG.2C  PULSE OF INTENSITY $I_1$
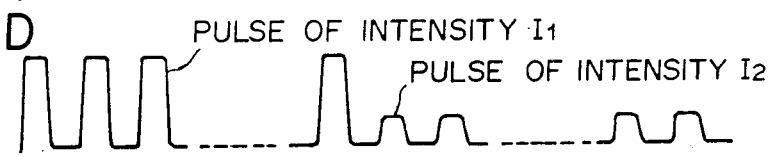
FIG.2D  PULSE OF INTENSITY $I_1$ / PULSE OF INTENSITY $I_2$

LIGHT BEAM SCANNING RECORDING APPARATUS WIDTH MODULATION OF BOTH TOTAL PULSE DURATION AND INTENSITY

BACKGROUND OF THE INVENTION

1. Field of the Invention

This invention relates to a light beam scanning recording apparatus for recording information on a recording material by scanning the recording material with a light beam. This invention particularly relates to a light beam scanning recording apparatus for recording a continuous tone image by using a semiconductor laser as a light beam generation means.

2. Description of the Prior Art

Light beam scanning recording apparatuses wherein a light beam is deflected by a light deflector and scanned on a light-sensitive recording material for recording information on the recording material have heretofore been used widely. As one of the means for generating a light beam in the light beam scanning recording apparatuses, a semiconductor laser is used. The semiconductor laser has various advantages over a gas laser or the like in that the semiconductor laser is small, cheap and consumes little power, and that the laser beam can be modulated directly by changing the drive current.

FIG. 4 is a graph showing the relationship between the optical output and the drive current of the semiconductor laser. As shown in FIG. 4, the optical output characteristics of the semiconductor laser with respect to the drive current change sharply at a drive current value. Therefore, it is not always possible to apply the semiconductor laser to recording of a continuous tone image. Specifically, it is difficult to control the optical output of the semiconductor laser over the point at which the optical output characteristics change sharply. Also, when intensity modulation is conducted by utilizing only the region on the upper side of the sharp change point wherein the characteristics are linear, it is possible to obtain a dynamic range of the optical output of only approximately 2 orders of ten at the most. As is well known, with a dynamic range of this order, it is impossible to obtain a continuous tone image having a high quality.

Accordingly, an attempt has been made to obtain a continuous tone image by maintaining the optical output of the semiconductor laser constant, continuously turning on and off the semiconductor laser to form a pulsewise scanning beam, and controlling the number of pulses for each picture element to change the scanning light amount.

However, in the case where pulse number modulation as mentioned above is conducted and a resolution of the scanning light amount of 4 orders of ten is to be obtained when the picture element frequency is 100 kHz, the pulse frequency must be adjusted to be as high as 1 GHz. Though the semiconductor laser itself can be turned on and off at such a high frequency, a pulse counting circuit or the like for control of the pulse number cannot generally be operated at such a high frequency. As a result, it becomes necessary to decrease the picture element frequency to a value markedly lower than the aforesaid value. Therefore, in the case where a continuous tone image is recorded by pulse number modulation, the recording speed becomes very low.

SUMMARY OF THE INVENTION

The primary object of the present invention is to provide a light beam scanning recording apparatus which quickly records a continuous tone image by use of a semiconductor laser.

Another object of the present invention is to provide a light beam scanning recording apparatus which quickly records a continuous tone image having a high image quality.

The present invention provides a light beam scanning recording apparatus for recording information on a recording material by modulating a laser beam emitted by a semiconductor laser and scanning the recording material with the modulated laser beam, wherein the improvement comprises modulating said laser beam by combining pulse number modulation or pulse width modulation with intensity modulation.

With the light beam scanning recording apparatus in accordance with the present invention, since pulse number modulation or pulse width modulation is combined with intensity modulation, it is possible to adjust the change range of scanning light amount to a large value by making up for a small width of pulse number modulation or pulse width modulation by intensity modulation. Therefore, it is possible to decrease the modulation pulse number per picture element, and to quickly record a continuous tone image having a high image quality.

BRIEF DESCRIPTION OF THE DRAWINGS

FIG. 1 is a schematic view showing an embodiment of the light beam scanning recording apparatus in accordance with the present invention, FIGS. 2A, 2B, 2C and 2D are explanatory views showing modulation of a laser beam in the embodiment of FIG. 1.

DESCRIPTION OF THE PREFERRED EMBODIMENTS

Figure 3:
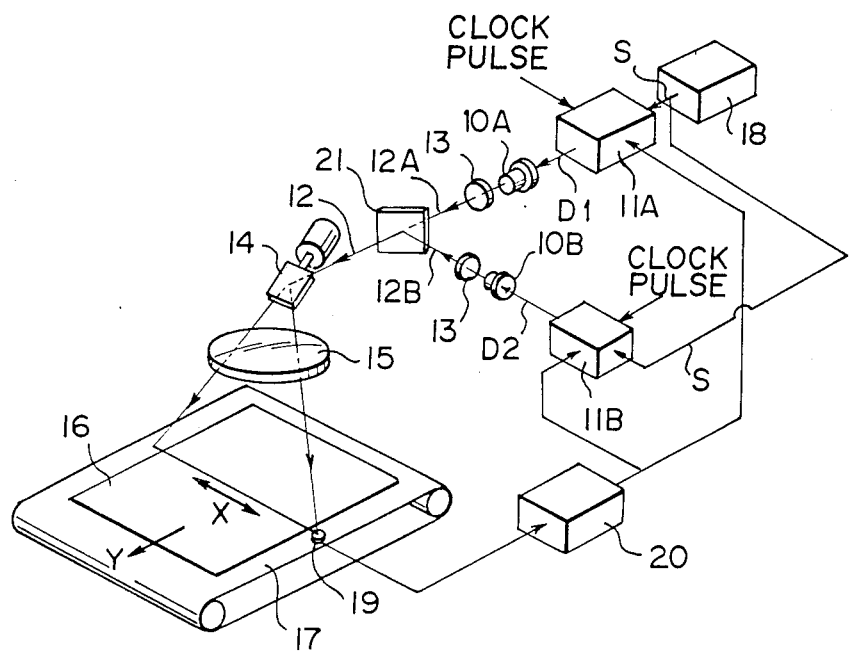
FIG. 3 is a schematic view showing another embodiment of the light beam scanning recording apparatus in accordance with the present invention.
Figure 4:
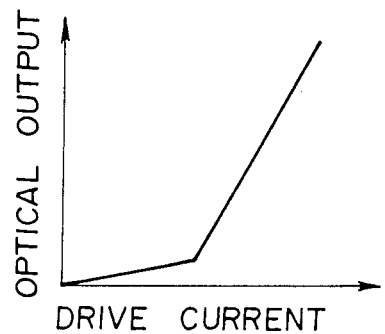
FIG. 4 is a graph showing the relationship between the drive current and the optical output of the semiconductor laser.

The present invention will hereinbelow be described in further detail with reference to the accompanying drawings.

Referring to FIG. 1, a drive current D is fed from a drive circuit 11 to a semiconductor laser 10, which emits a laser beam 12 having a light emission intensity in proportion to the drive current D. The laser beam 12 is collimated by a collimator lens 13 and deflected by a light deflector 14 which is constituted by a galvanometer mirror or the like. The deflected laser beam 12 is made to pass through a scanning lens 15, which is normally an fθ lens, and converged onto a recording material 16 formed of a silver halide photographic film or the like. Thus, the recording material 16 is scanned by the converged laser beam 12 in a main scanning direction as indicated by the arrow X. At the same time, the recording material 16 is moved by a recording material conveyance means 17 constituted by an endless belt device or the like in a sub-scanning direction as indicated by the arrow Y approximately normal to the main scanning direction as indicated by the arrow X, so that the overall surface of the recording material 16 is scanned by the laser beam 12 and a two-dimensional image is formed on the recording material 16.

For recording a continuous tone image on the recording material 16, the laser beam 12 is modulated as described below. The drive current D is fed pulsewise by the drive circuit 11 to the semiconductor laser 10 and the level of the drive current D is changed so that the semiconductor laser 10 pulsewise emits the laser beam 12 having a light emission intensity I1 or a light emission intensity I2. In this embodiment, the ratio of the light emission intensity I1 to the light emission intensity I2 is adjusted to I1/I2=128, and the maximum pulse number of the laser beam 12 per picture element is adjusted to be 254. Specifically, as shown in FIG. 2A, 254 clock pulses per picture element are fed to the drive circuit 11. The drive circuit 11 controls the turning on/off of the drive current D and the level thereof in accordance with an image signal S fed by an image signal feeder 18, thereby to change the number of pulses of the laser beam 12 (each pulse is synchronous with the clock pulse) and the light emission intensity (pulse amplitude) of the laser beam 12. Of course, when the pulse number of the laser beam 12 is zero, the scanning light amount per picture element becomes the minimum. The next minimum scanning light amount appears when only a single pulse of light emission intensity I2 is fed as shown in FIG. 2B. When the pulse number of the light emission intensity I2 is changed from one to 127, the scanning light amount changes from I2 to 127I2. When a single pulse of the light emission intensity I1 is fed as shown in FIG. 2C and no pulse of the light emission intensity I2 is fed, the scanning light amount becomes equal to 128I2. Also, when a single pulse of the light emission intensity I1 is fed and the fed pulse number of the light emission intensity I2 is changed from one to 127, the scanning light amount changes from 129I2 to 255I2. In the same manner, it is possible to change the scanning light amount up to 16,383I2 (i.e. 128I2×127+127I2, FIG. 2D) at intervals of the light amount of I2 by the combination of the pulses of the light emission intensity I1 with the pulses of the light emission intensity I2. Thus in this embodiment, a scanning light amount resolution of 14 bits (16,384 levels) is obtained with a pulse number modulation width of 254 per picture element. In the case where the recording material 16 is a silver halide photographic film, in order to obtain a continuous tone image having a high image quality, it is generally necessary that the change range of the exposure amount be slightly smaller than 3 orders of ten, and the scanning light amount resolution be not lower than 4 orders of ten. With the aforesaid embodiment, a scanning light amount resolution of not lower than 4 orders of ten is obtained reliably.

When the picture element frequency is 100 kHz in the aforesaid case, the frequency of the clock pulses is 25.4 MHz, and therefore the conventional circuits may be used as the logic circuits such as the pulse counting circuit for control of the pulse number or the like. In order to obtain a scanning light amount resolution of 14 bits with pulse number modulation alone as in the conventional technique, it is necessary to conduct pulse number modulation based on clock pulses having a frequency of 1.6383 GHz, and the conventional logic circuit cannot cope with such pulse number modulation. Therefore, in this case, the picture element frequency must be decreased to a value markedly lower than 100 kHz.

As is well known, the optical output of the semiconductor laser 10 readily fluctuates. Therefore, in this embodiment, a light amount detector 19 is disposed outside of the effective scanning region of the recording material 16 scanned by the laser beam 12, and the drive circuit 11 is controlled by a control circuit 20 based on the light amount detected by the light amount detector 19, thereby to obtain a predetermined optical output.

Another example of the method for obtaining the scanning light amount resolution of 14 bits as mentioned above will be described hereinbelow. In the case where the ratio of the light emission intensity I1 to the light emission intensity I2 of the laser beam 12 is adjusted to I1/I2=64, 64 levels (=6 bits) may be adjusted by pulse number modulation of the laser beam 12 of the light emission intensity I2, and 256 levels (=8 bits) may be adjusted by pulse number modulation of the laser beam 12 of the light emission intensity I1. Therefore, the maximum modulation pulse number (the number of clock pulses) per picture element is 63+255=318. Also, in the case where the ratio of the light emission intensity I1 to the light emission intensity I2 is adjusted to I1/I2=256, 256 levels (=8 bits) may be adjusted by pulse number modulation of the laser beam 12 of the light emission intensity I2, and 64 levels (=6 bits) may be adjusted by pulse number modulation of the laser beam 12 of the light emission intensity I1. Therefore, the maximum modulation pulse number (the number of clock pulses) per picture element is 255+63=318, which value is equal to the former case.

Though the light emission intensity of the semiconductor laser 10 is adjusted to the two stages in the aforesaid embodiment, it may also be adjusted to three or more stages. For example, in the case where the light emission intensity is adjusted to three stages, i.e. I1, I2 and I3, and the scanning light amount resolution of 14 bits is to be obtained by adjusting the light emission intensity ratios to be I1/I2=32 and I2/I3=16 (and consequently I1/I3=512), 16 levels (=4 bits) may be adjusted by pulse number modulation of the laser beam 12 of the light emission intensity I3, 32 levels (=5 bits) may be adjusted by pulse number modulation of the laser beam 12 of the light emission intensity I2, and 32 levels (=5 bits) may be adjusted by pulse number modulation of the laser beam 12 of the light emission intensity I1. In this case, the maximum modulation pulse number (the number of clock pulses) per picture element is 15+31+31=77. Also, in the case where the light emission intensity ratios are adjusted to be I1/I2=16 and I2/I3=8 (and consequently I1/I3=128), 8 levels (=3 bits) may be adjusted by pulse number modulation of the laser beam 12 of the light emission intensity I3, 16 levels (=4 bits) may be adjusted by pulse number modulation of the laser beam 12 of the light emission intensity I2, and 128 levels (=7 bits) may be adjusted by pulse number modulation of the laser beam 12 of the light emission intensity I1. In this case, the maximum modulation pulse number (the number of clock pulses) per picture element is 7+15+127=149.

As is clear from the foregoing description, in the case where the light emission intensity is adjusted to two stages, i.e. I1 and I2, the maximum modulation pulse number (the number of clock pulses) per picture element becomes the minimum when the light emission intensity ratio is $$I1/I2 = \sqrt[2]{\text{scanning light amount resolution}}.$$

Also, in the case where the light emission intensity is generally adjusted to N stages, the maximum modulation pulse number per picture element becomes the minimum when $$\frac{\text{light emission intensity ratio}}{} = ^N\sqrt{\text{scanning light amount resolution}}.$$

In order to increase the recording speed, the pulse number per picture element may be decreased. However, since the light emission intensity ratio of the semiconductor laser cannot be adjusted to be so large, the light emission intensity ratio should be adjusted by considering the picture element frequency, the characteristics of the semiconductor laser used, or the like.

FIG. 3 shows another embodiment of the light beam scanning recording apparatus in accordance with the present invention. In this embodiment, semiconductor lasers 10A and 10B are disposed, laser beams 12A and 12B emitted thereby are coalesced into a laser beam 12 by a semi-transparent mirror 21, and the recording material 16 is scanned by the coalesced laser beam 12. The semiconductor lasers 10A and 10B receive drive currents D1 and D2 fed respectively by drive circuits 11A and 11B, and emit the laser beams 12A and 12B pulsewise. In this case, the intensity of the laser beam 12 is changed by control of the turning on/off of the semiconductor lasers 10A and 10B. The intensity ratio of the laser beam 12A to the laser beam 12B and the conditions of pulse number modulation for obtaining the desired scanning light amount resolution are the same as in the case where the optical output of the single semiconductor laser 10 is changed in two stages. However, since the laser beams 12A and 12B are coalesced and scan the recording material 16 simultaneously, the maximum modulation pulse number per picture element is not equal to the sum of the maximum modulation pulse numbers per picture element of the laser beams 12A and 12B, but instead is equal to the maximum modulation pulse number per picture element of the laser beam 12A or the laser beam 12B whose width of pulse number modulation is larger. For example, in the case where the intensity ratio of the laser beam 12A to the laser beam 12B is adjusted to be 64/1 and the scanning light amount resolution of 14 bits is to be obtained by pulse number modulations of the laser beams 12A and 12B respectively to 256 levels (=8 bits) and 64 levels (6 bits), the maximum modulation pulse number per picture element is equal to 255.

Since the light transmittance and the light reflectivity of the semi-transparent mirror 21 may differ from each other, the intensity ratio of the laser beam 12A to the laser beam 12B must, of course, be defined with respect to the beam actually impinging upon the recording material 16, instead of the light emission intensity ratio of the semiconductor laser 10A to the semiconductor laser 10B. In this embodiment, the drive circuits 11A and 11B are controlled by the control circuit 20, so that the intensity of the laser beam 12A and the intensity of the laser beam 12B are maintained at predetermined values.

Also in the case where the laser beams emitted by a plurality of the semiconductor lasers are coalesced and scanning is conducted with the coalesced laser beam as in the second mentioned embodiment, the optical output of each semiconductor laser may be adjusted to a plurality of levels as in the case of the first mentioned embodiment. As a result, the maximum modulation pulse number per picture element becomes smaller. For example, in the embodiment of FIG. 3, the intensity of the laser beam 12A may be adjusted to two stages so that I1/I1'=4, the intensity of the laser beam 12B may be adjusted to two stages so that I2/I2'=4, and the intensity ratio may be adjusted so that I1/I2=128. In this case, in order to obtain the scanning light amount resolution of 14 bits, on the side of the laser beam 12A, four levels (=2 bits) may be adjusted by pulse number modulation of the laser beam of the intensity I1', and 32 levels (=5 bits) may be adjusted by pulse number modulation of the laser beam of the intensity I1. On the side of the laser beam 12B, four levels (=2 bits) may be adjusted by pulse number modulation of the laser beam of the intensity I2', and 32 levels (=5 bits) may be adjusted by pulse number modulation of the laser beam of the intensity I2. Consequently, the maximum modulation pulse number per picture element becomes equal to 31+3=34.

In the embodiment of FIG. 3, instead of the semi-transparent mirror 21, any other beam coalescing means such as a polarization beam splitter may be used for coalescing the laser beams 12A and 12B. The polarization beam splitter is advantageous in that it is possible to adjust the intensity ratio of the laser beam 12A to the laser beam 12B after coalescing to a desired value by rotating the plane of polarization of the polarization beam splitter. As the light deflector 14 for deflecting the laser beam, besides the aforesaid galvanometer mirror, it is also possible to use a rotating polygon mirror, a hologram scanner, an acoustooptic deflector (AOD) or the like.

Though the case where the recording beam is modulated by the combination of pulse number modulation with intensity modulation is described above, recording of a continuous tone image is also possible by conducting recording of each picture element with pulsewise light and modulating the width of the pulsewise light in accordance with the image signal. From the viewpoint of control of the light amount of light beam, pulse width modulation may be processed equivalently to pulse number modulation. For example, multiplication of the pulse width by "n" is equivalent to multiplication of the pulse number by "n" in pulse number modulation. Therefore, the same effects are obtained by conducting pulse width modulation instead of pulse number modulation.

I claim:

1. A light beam scanning recording apparatus for recording information on a recording material by modulating a laser beam emitted by a semiconductor laser and scanning the recording material with the modulated laser beam, said apparatus including means for performing a first modulation by pulse width modulating or pulse number modulating said laser beam to control the amount of light irradiating a given location on said recording material;

said apparatus further including means for intensity modulating said laser beam during said first modulation to further control the amount of light irradiating said given location, said means for intensity modulating comprising means for providing a plurality of laser beams, means for coalescing said laser beams to form a composite beam and means for changing the number of said laser beams which are coalesced in accordance with a desired intensity.

2. An apparatus as defined in claim 1 wherein said intensity modulation of said laser beam is conducted by controlling the drive current of said semiconductor laser.

3. An apparatus as claimed in claim 1, wherein said means for providing a plurality of laser beams comprises a plurality of semiconductor lasers.

4. A light beam scanning recording apparatus for recording information on a recording material by modulating a laser beam emitted by a semiconductor laser and scanning the recording material with the modulated laser beams, said apparatus including means for performing a first modulation by pulse width modulating or pulse number modulating said laser beam to control the amount of light irradiating a given location on said recording material;

said apparatus further including means for intensity modulating said laser beam during said first modulation to further control the amount of light irradiating said given location, said means for intensity modulating comprising means for providing a plurality of laser beams each having a different intensity, means for coalescing said laser beams to form a composite beam and means for changing the particular ones of said plurality of semiconductor laser beams which are combined to form said coalesced laser beam, in accordance with a desired intensity.

* * * * *